(No Model.)

L. R. CORDER.
COTTON CHOPPER.

No. 377,450. Patented Feb. 7, 1888.

Witnesses
Thos. Houghton.
Katie Parkhurst.

Inventor
Luther R. Corder.
By his Attorney,
John S. Duffie

UNITED STATES PATENT OFFICE.

LUTHER R. CORDER, OF JACKSONVILLE, ASSIGNOR OF ONE-HALF TO LADSON L. BOONE, OF LITTLE ROCK, ARKANSAS.

COTTON-CHOPPER.

SPECIFICATION forming part of Letters Patent No. 377,450, dated February 7, 1888.

Application filed October 17, 1887. Serial No. 252,521. (No model.)

*To all whom it may concern:*

Be it known that I, LUTHER R. CORDER, a citizen of the United States, residing at Jacksonville, in the county of Pulaski and State of Arkansas, have invented certain new and useful Improvements in Cotton-Choppers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in machines for chopping out the surplus cotton in its early growth, which is usually in drills or regular rows, it being desirable to retain only one or more stalks in every six or more inches; and it consists in the novel construction and arrangement of its parts, hereinafter fully set out in the specification and claims. I attain these objects by the mechanism illustrated in the accompanying drawings.

Figure 1:
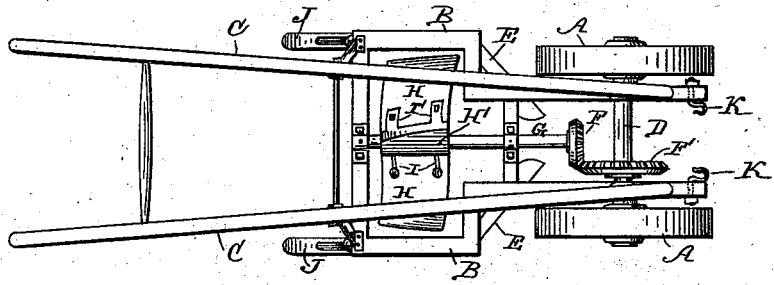
Figure 2:
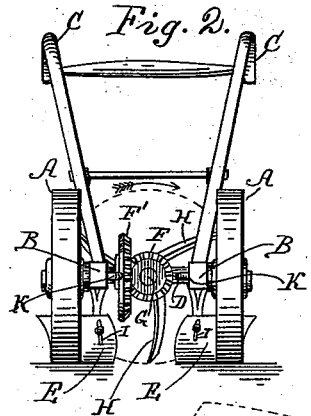
Figure 3:
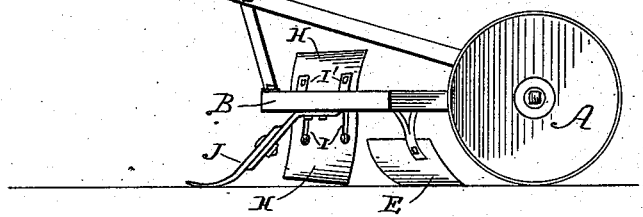
Figure 4:
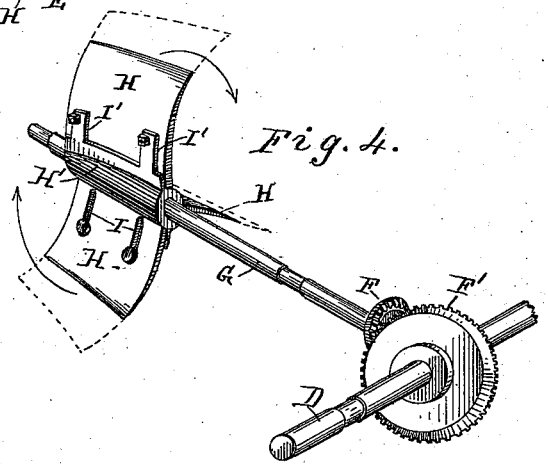
Figure 5:
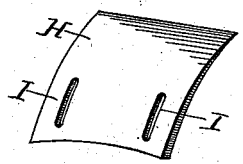

Figure 1 is a top view of the entire machine. Fig. 2 is a front view of the same. Fig. 3 is a side view of the machine. Fig. 4 is a detailed view of the head-block and knives attached. Fig. 5 is a detail view of one of the knives.

Similar letters refer to similar parts throughout the several views.

A A are the wheels to which the axle D is attached, which produces the rotary motion of the head-block H' by means of the cog-wheels F and F' attached to the longitudinal shaft G and the axle D.

B B is a frame attached to the axle D, and to which is attached the longitudinal shaft G and the head-block H' and handles. Said frame is enlarged at its rear end to make room for the choppers to revolve freely.

C C are the handles attached to the frame, by which the machine can be guided and controlled and lifted to skip any portion of a row that does not require chopping, or pressed down, causing the spring J to yield, and forcing the chopper down into any depression in the row to chop the cotton therefrom.

D is an axle attached to the wheels A A and journaled to said frame, to which is attached the cog-wheel F'.

E E are plow-knives attached to the frame, by means of which the earth is ploughed away from the row of standing cotton, leaving about four inches of earth around the cotton-plants to be cut away by the choppers.

F F' are the cog-wheels attached to the axle D and to the longitudinal shaft G to produce regular rotary motion to the said longitudinal shaft, to which are attached the head-block H' and the knives H H H. G is a longitudinal shaft to which is attached the head-block H' and said knives. The said knives H are attached to the said head-block H' in a diagonal direction, with slots I to adjust to any depth required.

I' are lugs to secure the knives in position by means of bolts and nuts or other substantial means.

J are adjustable springs attached to the frame to adjust the height of the frame from the ground, which may be made in one piece or in two pieces and held together by bolts and nuts.

K are hooks attached to the frame to attach stretchers to, which may be affixed to doubletrees or singletrees, so that the machine may be propelled or drawn by horses.

Having described my invention, what I claim as new, and desire to obtain by Letters Patent, is—

1. The combination, with the frame B, having the wide rear end, as described, the plow-knives E, attached thereto, and the adjustable spring-runners J, of the axle D, cog-wheels F F', longitudinal shaft G, head-block H', secured on said shaft having the ribs I', and the adjustable choppers H, substantially as shown and described.

2. The combination of the frame B, having the wide rear end, as described, and bearing the plow-knives E, the geared longitudinal shaft G, bearing head-block H', with ribs I', and adjustable choppers H, secured in said head-block, and adjustable spring-runners J, secured to the rear end of said frame, substantially as shown and described.

In testimony whereof I affix my signature in presence of two witnesses.

LUTHER R. CORDER.

Witnesses:
H. C. HINTON,
I. A. DALE.